3,851,079
PROCESS FOR PREPARING EDIBLE
PROTEIN FIBERS
Takashi Sakita, Yokohama, Japan, assignor to
Nisshin Oil Mills, Ltd.
No Drawing. Filed June 23, 1972, Ser. No. 265,451
Claims priority application Japan, Feb. 1, 1972,
47/10,946
Int. Cl. A23j 3/00
U.S. Cl. 426—276                 7 Claims

ABSTRACT OF THE DISCLOSURE

Edible protein fibers are prepared by extruding an alkaline spinning dope into a coagulating bath comprising organic acids, neutral inorganic salts and hydrogen peroxide.

BACKGROUND OF THE INVENTION

(1) Field of the invention

The present invention relates to a process for the preparation of edible protein fibers and more particularly to a coagulating bath suitable for use in said process.

(2) Prior Art

Heretofore, a mixed solution of acids and salts has been usually employed as a coagulating bath for preparing edible protein fibers from defatted soybeans. However, the spinning of such fibers is not possible unless the types and amounts of the inorganic neutral salts to be jointly used are suitably selected according to the type of acid used. By way of example, there is the necessity to add sodium chloride to the degree of a 5% by weight in the case where sulfuric acid is employed, while in the case of hydrochloric acid or phosphoric acid it is necessary to add about 2 to 5% by weight of sodium sulfate as well as sodium chloride to make the total concentration of salts about 10% by weight. Each of these inorganic acids is used in an amount of not more than 10% by weight, preferably from 3 to 5% by weight. However, it is extremely difficult to neutralize the spun acidic fibers to a pH of usually 5.5 to 7.0 to use the same for food because the pH of the coagulating bath is below 1.5. In the course of neutralization of acidic fibers having a pH of below about 1.5, the pH range of 2.0 to 2.5 is the most difficult area through which to attain neutralisation.

On the one hand, when organic acids, such as, for example, acetic acid, lactic acid, malic acid, succinic acid, citric acid, fumaric acid, adipic acid and the like, are used in a coagulating bath, the advantages are: (1) the spinning can be effected in the coagulating bath with a pH of more than 2.5; (2) the neutralization of the fibers after coagulation is far more manageable as compared with the case of inorganic acids; furthermore (3) the spinning can be effected at a stabilized pH due to the buffer action of salts of organic acids which are formed in the coagulating bath at the time of spinning. On the other hand, the disadvantages are; (1) the organic acids are lacking in coagulability for the spinning solution; (2) there is need to use sodium sulfate in addition to sodium chloride, and (3), the spinning can not be carried out unless the total concentration of salts is over about 15% by weight; namely, a large amount of salts corresponding to two to three times the case of inorganic acids is used.

OBJECTS OF THE INVENTION

An object of the present invention is to provide a coagulating bath suitable for spinning a protein curd dope isolated from defatted soybeans.

Another object of the present invention is to provide a process for the preparation of edible soybean protein fibers in which the spinning can be effected in the coagulating bath with lower concentration of salts and the acidic fibers thus spun can be easily neutralised.

SUMMARY OF THE INVENTION

The present invention relates to a process for the preparation of edible protein fibers by alkalizing and redissolving a protein curd isolated from defatted soybeans and extruding the thus obtained spinning dope through fine holes into a coagulating bath to form the protein fibers. The invention is characterized in that the coagulating bath comprises an organic acid, an inorganic neutral salt and hydrogen peroxide.

According to the present invention, a combination use of hydrogen peroxide with organic acids in the coagulating bath overcomes the disadvantages that the use of organic acids caused, and it offers a coagulating bath composition that has such excellent coagulability that the spinning is effected with the same content of salts as about 5% by weight of sodium chloride used in the case of sulfuric acid. This coagulability is said to be the most excellent among the inorganic acids.

Besides, this is the first time according to the process of the invention that superior neutralizability of the organic acids is substantially and efficiently utilized.

DETAILED DESCRIPTION OF THE INVENTION

As stated above, the coagulating bath used in the present invention is characterized by a composition of organic acids, inorganic neutral salts and hydrogen peroxide. The concentration of hydrogen peroxide to be used in the coagulating bath is within the range of approximtaely 0.5% to 2% by weight, preferably 0.7 to about 1.2% by weight, of the total amount of the coagulating bath, and it is not always necessary to add sodium sulfate to the coagulating bath. The amounts of the organic acids and the inorganic neutral salts are within the ranges of about 3 to 5% by weight and 3 to 7% by weight respectively, based on the total amount of the coagulating bath. A superior ability of hydrogen peroxide to promote coagulation is believed to be due to the fact that when the soybean protein curd is peptized by an alkali, the oxidation polymerisation or cross linking of the unfold protein molecules in the reduced state would contribute to the property of coagulating.

The acid fibers coagulated according to the present invention are subsequently washed and neutralized with sufficient washing in water to remove hydrogen peroxide. The acidic fibers after spinning, as desired, are treated with a dilute solution of reducing materials such as sodium hydrosulfite, sodium hydrogen sulfite and the like to remove hydrogen peroxide and thereafter washing with water may be repeated.

DESCRIPTION OF SPECIFIC EMBODIMENTS

The following examples illustrate the invention.

EXAMPLE 1

After extracting proteins from a slightly denatured, defatted soybean having 92% soluble nitrogen content at a pH of 9.5 with the use of water in 10 times the amount of said soybean plus sodium hydroxide, hydrochloric acid was added to the thus alkali-extracted solution from which insoluble materials are removed in advance, to coagulate and precipitate the protein at a pH of 4.5 the same was centrifugally recovered, and a protein curd was obtained.

The alkali-peptized solution or spinning dope having a protein concentration of 15.5% by weight, a pH of 12.6 and a viscosity of 12,000 cps. (at 35° C.), was prepared by adding water and sodium hydroxide to the above protein curd. Acidic fibers having a pH of 3.8 were obtained by extruding the above spinning dope after having defoamed and filtered, through fine holes of 0.08 mm. in diameter into a coagulating bath having a pH of 3.5 and composed of an aqueous solution of 5% by weight acetic acid, 5% by weight sodium chloride and 1% by weight hydrogen peroxide. In contrast, in the case when no hydrogen peroxide was added into the coagulating bath, the spinning dope did not coagulate, or if coagulated, so obtained fibers were so breakable that the spinning could not be effected.

The above described acidic fibers, prepared according to the process of the present invention, after having been neutralized with sodium hydrogen carbonate to a pH of 6.5, were treated with about 0.02% sodium hydrogen sulfite aqueous solution at about 90° C. and then washed with water three times to obtain edible protein fibers.

EXAMPLE 2

To prepare acidic fibers having a pH of 4.6, a spinning dope obtained after defoaming and filtration, prepared in the same procedure as shown in Example 1, was extruded through fine holes of 0.08 mm. in diameter into a coagulating bath of a pH of 4.3 which was an aqueous solution composed of 5% by weight succinic acid, 4% by weight sodium chloride, 1% by weight sodium sulfate and 1.2% by weight hydrogen peroxide (adjustment of the pH of the bath being made with sodium hydroxide).

In contrast, in the case where no hydrogen peroxide was incorporated into the coagulating bath, the sprinning dope did not coagulate, or if coagulated, obtained fibers were so breakable that the spinning could not be effected.

Edible protein fibers having a pH of approximately just over 6 were easily made from the acidic fibers of the present invention mentioned above with mere washing by water.

The water washing not only effects the neutralizing of the acidic fibers, but also effectively removes hydrogen peroxide. Therefore, there is no need to use sodium hydrogen sulfite to decompose hydrogen peroxide, but if it is used the extremely small amount, i.e., a concentration of not more than 0.01% of it, may be quite sufficient for removal of hydrogen peroxide.

What is claimed is:

1. Process for preparing edible protein fibers which comprises (a) dissolving a protein curd separated from defatted soybeans with aqueous alkali to form a spinning dope; (b) extruding said spinning dope through fine holes into a coagulating bath to form protein fibers, said coagulating bath consisting essentially of a aqueous solution of from about 3% to about 5% by weight of organic acids, from about 3% to about 7% by weight neutral inorganic salts and from about 0.5% to about 2% by weight hydrogen peroxide, and said coagulating bath having a pH of at least 2.5; and (c) subsequently washing the coagulated fibers.

2. A process according to claim 1, wherein the coagulated fibers are adjusted to a pH of about 5 to 7 and washed with water sufficiently to remove residual hydrogen peroxide.

3. A process according to claim 1, wherein the coagulating bath consists essentially of an aqueous solution of: (a) about 4% by weight of acetic acid, (b) about 5% by weight of sodium chloride, and (c) about 0.7% by weight of hydrogen peroxide, the percentage of each of said components being based on the total weight of the coagulating bath.

4. A process according to claim 1, wherein the coagulating bath consists essentially of an aqueous solution of: (a) about 5% by weight of succinic acid, (b) about 4% by weight of sodium chloride, (c) about 1% by weight of sodium sulfate, and (d) about 1.2% by weight of hydrogen peroxide, the percentage of each of said components being based on the total weight of the said coagulating bath.

5. In a process for preparing edible protein fibers by dissolving a protein curd separated from defatted soybeans with aqueous alkali to form a spinning dope and extruding said spinning dope through fine holes into a coagulating bath to form protein fibers, the improvement wherein the coagulating bath consists essentially of an aqueous solution of from about 3% to about 5% by weight of organic acids, from about 3% to about 7% by weight inorganic neutral salts and from about 0.5% to about 2% by weight hydrogen peroxide, said coagulating bath having a pH of at least 2.5, and the coagulated acid fibers are contacted during subsequent washing steps, with a dilute solution of reducing material to remove residual hydrogen peroxide which may remain and thereafter said coagulated fibers are washed with water.

6. A process according to claim 5, wherein the reducing material is present in the dilute solution, in a concentration of not more than about 0.02%.

7. A process according to claim 5, wherein the reducing material is sodium hydrogen sulfite.

References Cited

UNITED STATES PATENTS

| | | | |
|---|---|---|---|
| 3,343,963 | 9/1967 | Kjelson | 99—14 |
| 3,403,027 | 9/1968 | Page et al. | 99—17 |
| 3,468,669 | 9/1969 | Boyer et al. | 99—17 |

JAMES R. HOFFMAN, Primary Examiner